UNITED STATES PATENT OFFICE.

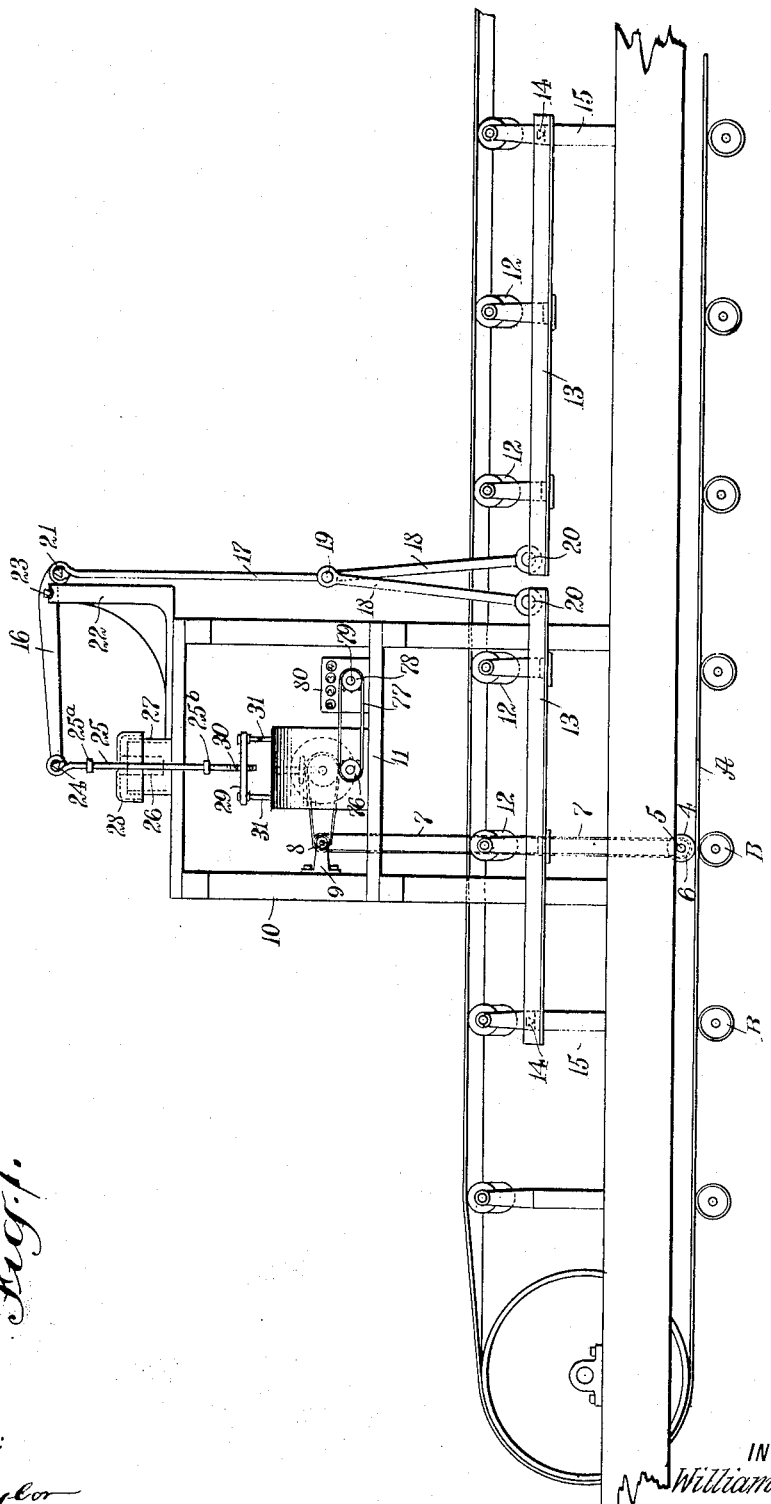

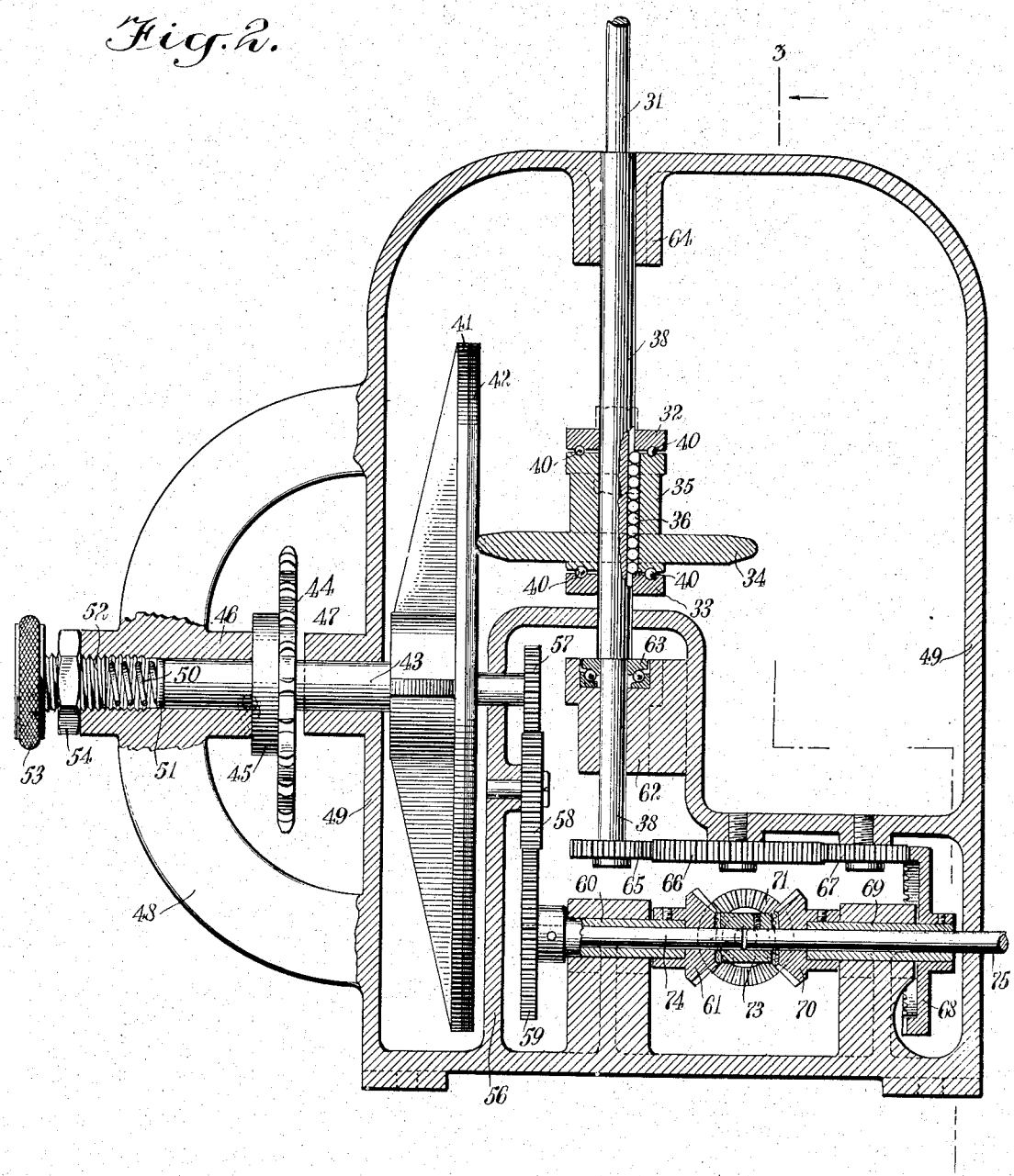

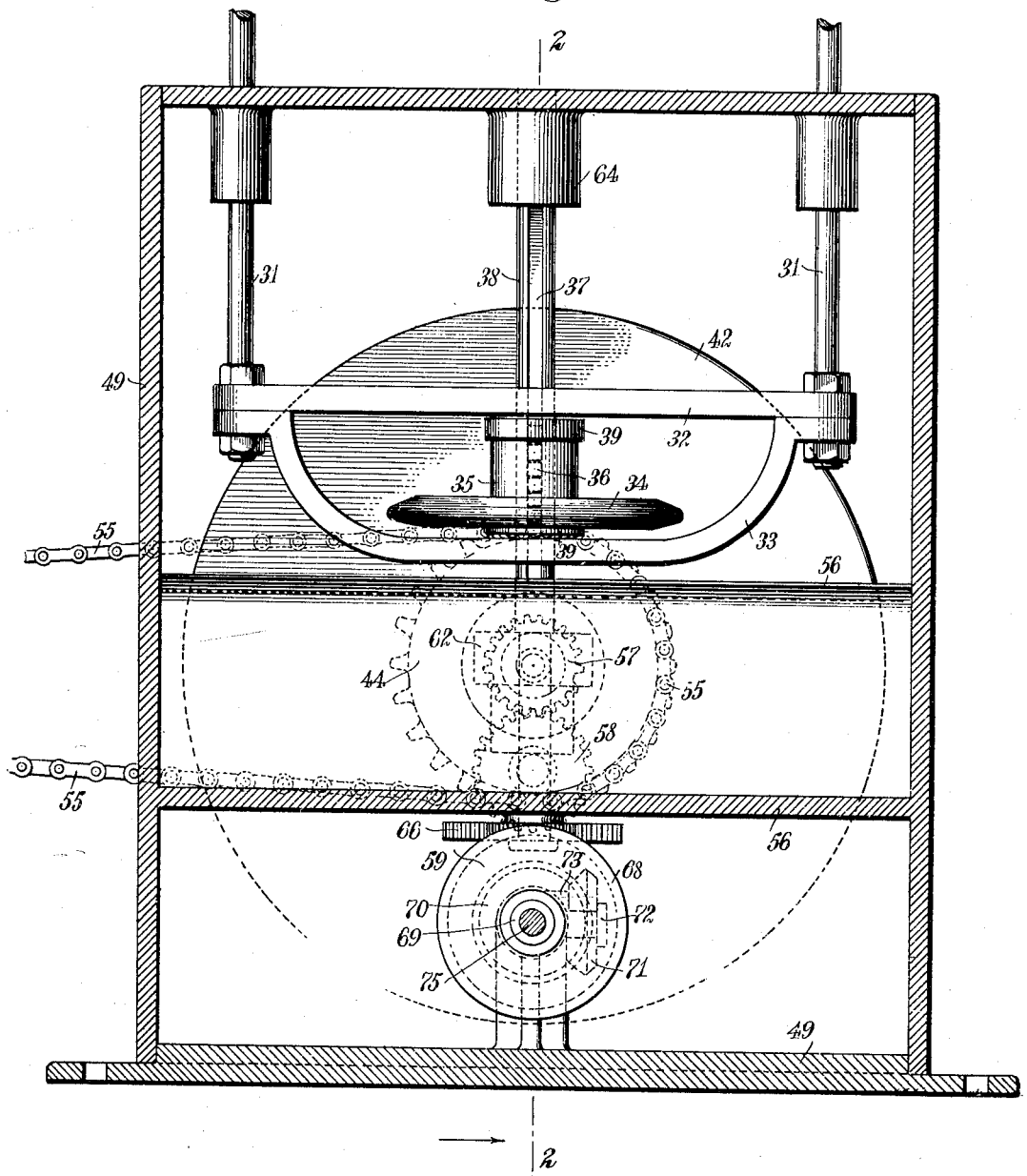

WILLIAM PENNEFATHER BUCHAN, OF SILVER CREEK, NEW YORK.

INTEGRATOR FOR CONVEYER-BELT WEIGHING-SCALES.

1,032,183.  Specification of Letters Patent.  Patented July 9, 1912.

Application filed June 13, 1910. Serial No. 566,586.

*To all whom it may concern:*

Be it known that I, WILLIAM P. BUCHAN, a subject of the King of Great Britain, and a resident of Silver Creek, in the county of Chautauqua and State of New York, have invented a new and Improved Integrator for Conveyer-Belt Weighing-Scales, of which the following is a full, clear, and exact description.

Among the principal objects which the present invention has in view are: to provide a registering mechanism arranged to display for record the totalized result showing the aggregated weight of the material which has passed over a belt conveyer when operatively connected with the said mechanism; to provide an automatic registering mechanism to record accumulatively the total weight as the same is passed over a belt conveyer to which the mechanism is attached, irrespective of the rate of travel of the belt, whereby speed variation in the conveyer mechanism incident to load variation is instantly compensated; and to provide a mechanism for a weightometer of the character specified which is simple, efficient and durable.

One embodiment of the present invention is disclosed in the structure illustrated in the accompanying drawings, in which like characters of reference denote corresponding parts in all the views, and in which—

Figure 1 is a side elevation of a belt conveyer weighing device, having attached thereto a weightometer constructed and arranged in accordance with the present invention; Fig. 2 is a vertical cross section of the weightometer taken on the line 2—2 in Fig. 3; and Fig. 3 is a vertical longitudinal section of the weightometer taken on the line 3—3 in Fig. 2.

To adapt a weight measuring mechanism to an endless conveyer of the character shown, where the material being weighed is in transit, it is necessary to consider the factor of the speed of the belt. For this purpose there is provided a pulley 4, the periphery whereof is exactly one foot in circumference. The pulley 4 is mounted to rest firmly on the belt A of the conveyer, and preferably above the idler B provided for the return of the said conveyer after having delivered the load which it has carried. The pulley 4 is fixedly mounted on a shaft 5, upon which is likewise fixedly mounted a sprocket wheel 6. The sprocket wheel 6 is connected by means of a sprocket chain 7 with a sprocket wheel of equal diameter mounted upon a shaft 8. The shaft 8 is suitably mounted in brackets 9, 9, set out from the superstructure 10, supporting the weightometer upon a platform 11. In this manner the rate of travel of the belt A is accurately represented in foot measurement by the number of revolutions of the shaft 8.

The lower extension of the belt A being carried on the fixed idlers B, B, the said extension does not vary in its vertical adjustment. The upper extension of the belt A does vary, being depressed by the load carried thereon when passing over the pulleys 12, 12. The pulleys 12, 12 are supported in brackets fixedly secured to the scale beams 13, 13, which are provided with knife edge pivots 14, 14 suitably supported on framing standards, 15, 15. The juxtaposed ends of the beams 13, 13 are suspended from the short end of a steel yard 16, to which they are connected by means of a suspension rod 17 and hanger bars 18, 18. The hanger bars 18, 18 are connected with the suspension rod 17 by a cross head 19, and are pivotally connected with the scale beams 13, 13 by pivots 20, 20. The suspension rod 17 is provided with eyelets suspended upon knife edge pivots 21, 21, while the steel yard is suspended in standards 22, 22 by knife edge pivots 23, 23. The standards 22 are suitably supported upon the superstructure 10. The free end of the steel yard 16 is connected by means of a knife edge pivot 24 to a weight bar 25$^a$. The weight bar 25$^a$ is provided in fixed relation thereon with a dead weight 26. The side bars 25 are connected at the bottom to the cross bar 25$^b$. The dead weight 26 is a hollow block of metal suspended from the bar 25$^a$, and is extended within a receptacle 27 provided with a mercury bath, the function whereof is to float the weight 26 as the same is immersed in the said bath. The weight 26 is provided with a dome top 28, adapted to telescope over the receptacle 27 to prevent the admission to the bath of dust or other detritus.

The lower ends of the side bars 25 are secured to a cross bar 25$^b$. The connection between the cross bar 29 and the bar 25$^b$ is by means of a screw threaded end section 30. Any suitable form of connection for the bar 25$^b$ with the bar 29 may be adopted. It is desired that the connection shall provide for the vertical adjustment of the cross bar as the same is, by means of connecting rods 31, 31, attached to a cross head 32, between which and a bridge 33 a roving pulley 34 is mounted.

The pulley 34 is provided with an elongated bearing hub 35. The hub 35 is longitudinally slotted in its inner surface to form a raceway for a plurality of small rollers 36. The rollers 36 are disposed to extend within the slot in the hub 35 and in a vertical groove 37 formed in a shaft 38. The hub 35 is further provided with extended end flanges 39, 39. In the flanges 39, 39 are formed ball races to receive balls, 40, 40 to form thrust bearings for the said hub.

The pulley 34 is driven by the frictional contact with a driving disk 41, which is provided with a suitable friction face 42. The disk 41 is fixedly mounted on a shaft 43, upon which is likewise mounted a sprocket wheel 44. The sprocket wheel 44 is fixedly mounted on the said shaft, and is provided with a hub 45. The shaft 43 is mounted in suitable bearings formed in bosses 46 and 47, the former of which is integrally formed in a bracket yoke 48 and in the side of the casing 49 in which the mechanism is mounted. The disk 41 is maintained in frictional contact with the pulley 34 by a spring 50. The spring 50 is disposed between a washer 51 and the end of a screw 52. The screw 52 is provided with a knurled head 53 and a lock nut 54. The shank of the screw 52 is threaded to engage the threaded end of the boss 46, as shown in Fig. 2 of the drawings. By means of the screw 52 any desired tension may be exerted through the medium of the washer 51 and shaft 43 upon the disk 41 to maintain the close frictional contact with the pulley 34.

The sprocket wheel 44 is connected with the sprocket wheel on the shaft 8 by a sprocket chain 55. Any suitable variation between the rotation of the shaft 8, (which, it will be remembered, is the same as the rotation of the shaft 5, and equals the one foot travel rate of the belt A,) is formed by varying the comparative diameters of the wheel on the shaft 8 and the wheel 44. As shown in the present drawings the variation is two for one. That is to say, the wheel 44 is twice the diameter of the wheel on the shaft 8, and the consequent rotation of the shaft 43 is one-half the number of rotations of the shaft 8.

The shaft 43 is reduced at the forward extremity, and extended beyond the face of the disk 41, and through a partition 56, a bearing being formed therein for the said shaft 43. Upon the end of the reduced extension is mounted a gear wheel 57, which is meshed with a second gear wheel 58, which, in turn, is meshed with a large gear wheel 59. The three gears 57, 58 and 59 are proportioned to produce in a tubular shaft 60 a reduction of the speed of rotation of the shaft 43 by one-half. The result of this transmission mechanism above described is that the tubular shaft 60, and a bevel gear 61 fixedly mounted thereon, have a rotary speed of one-quarter that imparted to the shaft 8 or 5 by the belt A, or rotate one-fourth of the number of revolutions imparted to the shafts 5 and 8.

The partition 56 is extended lengthwise of the casing 49, and forms supporting bosses for the wheel 58 and a bearing block 62. In the bearing block 62, and in a recess at the upper end thereof, is mounted a thrust ball bearing cage 63. Upon the superposed member of the cage 63 rests the shaft 38, upon which the hub 35 of the wheel 34 is slidably mounted. The shaft 38 is mounted in a bearing 64 at the top of the casing 49.

At the lower end of the shaft 38 is fixedly mounted a gear wheel 65. The gear wheel 65 is meshed with a gear wheel 66, which is also meshed with a smaller gear wheel 67. The gear wheel 67 is engaged with a crown gear 68, the teeth of which may be formed of shortened or narrow spurs or of pins. The crown gear 68 is fixedly connected to a tubular shaft 69, upon the ends of which is fixedly mounted a bevel gear 70. The bevel gear 70 is identical in size and in teeth with the bevel gear 61, and the train of transmission gears, 65 to 68 inclusive, produce the same speed revolution as do the transmission gears 57, 58 and 59. The number of gears employed in transmission from the shaft 38 to the shaft 69 is such that the gear wheels 61 and 70 are rotated in opposite directions and at identically the same rate of speed.

Mounted between the gears 61 and 70 is a planetary gear 71. The gear 71 is pivotally mounted on a bearing formed on a screw 72, which is fixedly secured in a block 73. The block 73 is perforated to form bearings for shafts 74 and 75, to the latter of which the said block is fixedly connected. The shafts 74 and 75 are mounted in the tubular shafts 60 and 69 respectively. The shaft 74 forms a steady pin for the block 73. The enlarged head of the screw 72 holds the gear 71 in meshed relation with the gears 61 and 70.

Mounted on the shaft 75, at the outside of the casing 49, is sprocket wheel 76. The sprocket wheel 76 is connected by means of a sprocket chain 77 with a second sprocket wheel 78. The sprocket wheel 78 is mounted on the master shaft 79 of a suitable comptometer 80, the tabulating wheels of which are suitably exposed through the casing of the comptometer. In the manipulation of the present mechanism the readings of the comptometer are taken from time to time, and a record made thereof. Any suitable method of making the record may be employed, that recommended would be to reset the comptometer to the initial or zero point of its mechanism when and as each tally or record is made.

The operation of the weightometer is as follows: It will be understood that the weight carried over the scale beams 13, multiplied by the time and the rate per minute travel of the belt A, would give as a result the total weight of the materials which pass over the beams 13 in the period of time set. It is the object of the present mechanism to mechanically produce this result. To accommodate the mechanism, and to conform the same to the comptometer, the present construction is geared in such manner that the shaft 75 is revolved at a rate equal to one-fourth of the difference in revolutions between the shaft 38 and shaft 43. The record of each revolution, of the comptometer shaft 75, would indicate one hundred pounds of weight carried by the belt A, for a certain period as will be more fully explained. The pulley 34 is disposed with reference to the disk 41 accurately, so that the normal or initial path of the pulley 34 on the disk 41 or face 42 thereof is removed from the center of the disk 41 exactly the distance equal to the radius of the pulley 34. This arrangement results in producing, by means of the disk 41, a rotary speed in the shaft 38 exactly equaling the rotary speed of the shaft 43. When the pulley 34 is in this position the speed of the gears 61 and 70 is exactly equal, and the gear 71 is maintained orbitally immovable, rotating on its own axis without revolving the shaft 75. The cross head 32 and bridge 33 are connected with the rods 31, 31, which are connected with the steel yard 16. Between the cross head 32 and the bridge 33, and controlled thereby, is the pulley 34. When the end of the steel yard 16 is raised by the load carried on the belt A passing over the suspended scale beams 13, 13, the pulley 34 is elevated to assume a new path on the disk face 42. The movement of the steel yard 16 is regulated by the weight 26 floating in the mercury contained in the receptacle 27, and the deflection of the said steel yard and the pulley 34 connected therewith is proportioned to the weight mounted on the beams 13, 13. It will be understood that the belt A is traveling at a substantially constant rate of speed, and that through the transmission mechanism from the pulley 4 to the disk 41 a correspondingly constant rotation is transmitted to the said disk 41. When, as stated, the pulley 34 is lifted, the linear increase of the path of travel of the pulley 34 produces an acceleration of the speed of rotation of the shaft 38, and a proportional increase in the revolutions of the shaft 69 and wheel 70, above the number of revolutions of the shaft 60 and the wheel 61. The immediate result of the difference in the revolutions of the wheels 70 and 61 is that the planetary gear 71 starts to revolve the shaft 75. The shaft 75 is revolved as the revolutions of the shaft 38 are varied in proportion to the revolutions of the shaft 43. It will be understood that, if the weight is increased or decreased on the belt A, the immediate effect on the mechanism described is to alter the position of the steel yard 16 and the pulley 34. With the alteration of the position of the pulley 34 on the disk 41, the ratio of revolutions of the shaft 75 to the shaft 60 is varied.

From the above it will be understood that at a standard rate of travel of the belt A, the lift of one hundred pounds on the steel yard 16 disposes the pulley 34 in a position on the disk face 42 which will produce one revolution of the shaft 75 in unison with the movement of the belt one foot. From this it will be seen that if the belt continues to carry the load of one hundred pounds for one hundred feet there would be produced on the shaft 75 one hundred revolutions. Through the translating mechanism of the comptometer 80 the register would be arranged to display a total of ten thousand pounds. Should the load be varied in the one hundred foot travel from five hundred pounds to one hundred pounds in equal proportion, the shaft 75 would have been revolved two hundred and fifty revolutions during the fifty feet of belt travel with the five hundred pounds, and fifty times during the belt travel of fifty feet with the one hundred pounds, or a total of three hundred revolutions, which would result on the comptometer as a showing of thirty thousand pounds.

From the above it will be seen that as the pulley 34 is radially shifted on the disk face 42, the revolution of the shaft 75 is varied concomitantly with the rate of the belt travel. It will also be seen that as the weight is decreased, the disproportion of revolutions between the wheels 70 and 61 is diminished until, when there is no weight carried on the conveyer belt, there is no disproportion and consequently no revolution of the shaft 75. From this it will be seen that the shaft 75 and the comptometer 80 connected therewith, are operated only when there is weight carried by the belt A and in accurate proportion to the weight carried thereon.

With a mechanism constructed and arranged as above described the attendant, superintendent or manager, can, at any time, ascertain by glancing at the comptometer or the tally records taken therefrom, the total volume of material which has traveled over the conveyer and the beams 13, 13 in any given time. And, further, that this result is rapidly if not instantaneously obtained. Up to the limits of the comptometer it is unnecessary to perform any arithmetical problem other than that of reading from the comptometer the totalized result.

Having thus described my invention, what I claim as new and desire to secure by Letters Patent is:—

1. In integrator for conveyer belt weighing scales comprising a rotary disk; means for rotating said disk; a rotary shaft disposed in radial relation to said disk, the axis of said shaft being parallel with the face of said disk, the said shaft having a groove formed longitudinally therein; a roving disk slidably mounted on said shaft and having frictional contact with the face of said rotary disk; an elongated hub for said roving disk, said hub having a groove formed therein corresponding with the groove in said shaft; rolling devices mounted in said grooves to maintain the alinement of said shaft and said roving disk; an adjustable pressure device for maintaining the said rotary disk in contact with the said roving disk; a supporting frame for said roving disk guidably mounted on the said shaft and having thrust bearings for said hub; a comptometer having a driving shaft; a planetary gear wheel operatively connected with said comptometer; a transmission mechanism operatively connecting said planetary gear wheel and said rotary disk; and a second transmission mechanism operatively connecting said planetary gear wheel and said roving disk.

2. In a mechanism such as described, a permanent rotary driving member having a friction engaging surface gradually increased in diameter from the rotary center; a roving rotary driven member having peripheral engagement with said surface to move radially thereover; a driving shaft to rotate in unison with said permanent member; a driven shaft to rotate in unison with said roving member; a transmission mechanism connecting said shafts and embodying a planetary gear wheel and shaft connected therewith; means for mechanically counting the revolutions of the shaft of said planetary gear wheel; and means for moving said roving member over the surface of said permanent member.

3. In a mechanism such as described, a continuously moving belt; a rotary driving shaft operatively and constantly connected with said belt; a mechanical counting mechanism operatively and constantly connected with said driving shaft; a second shaft operatively and constantly connected with said counting mechanism to operate the same in a direction the reverse to that imparted by the said driving shaft; and means constantly connecting said belt and said second shaft for decreasing and accelerating the speed of said second shaft in accordance with the depression and elevation respectively of said belt.

In testimony whereof I have signed this specification in the presence of two subscribing witnesses.

WILLIAM PENNEFATHER BUCHAN.

Witnesses:
LOUIS D. HOUSE,
EDWIN L. COON.